United States Patent [19]

Soroka

[11] 4,367,992

[45] Jan. 11, 1983

[54] BROACHING MACHINE

[75] Inventor: Daniel P. Soroka, Franklin, Pa.

[73] Assignee: Westinghouse Electric Corp., Pittsburgh, Pa.

[21] Appl. No.: 175,975

[22] Filed: Aug. 7, 1980

[51] Int. Cl.³ .......................................... B23D 41/04
[52] U.S. Cl. .................................... 409/264; 409/287
[58] Field of Search .............. 409/256, 264, 265, 266, 409/267, 287, 280

[56] References Cited

U.S. PATENT DOCUMENTS

| 2,421,793 | 6/1947 | Uska | 409/264 |
| 2,529,705 | 11/1950 | Pataki et al. | 409/267 |
| 2,849,928 | 9/1958 | Thompson | 409/264 X |
| 2,858,744 | 11/1958 | Vacksy | 409/267 |
| 3,180,231 | 4/1965 | Abbott, Jr. | 409/260 X |
| 4,181,458 | 1/1980 | Roturier | 409/265 |

Primary Examiner—William R. Briggs
Attorney, Agent, or Firm—F. J. Baehr, Jr.

[57] ABSTRACT

A broaching machine for simultaneously broaching a multiplicity of holes in a tube support sheet.

4 Claims, 13 Drawing Figures

BROACHING MACHINE

BACKGROUND OF THE INVENTION

This invention relates to a broaching machine and more particularly to a machine for broaching multiple holes in a tube support plate for a steam generator.

Tube support plates for steam generators presently being built have approximately 10,000 holes formed in a cloverleaf shape, because of the large size of the tube support sheets approximately 10 feet in diameter and the large number of holes to be broached a machine capable of simultaneously broaching multiple holes is required.

SUMMARY OF THE INVENTION

Broaching apparatus for broaching a plurality of holes in a workpiece utilizing a plurality of broaches, when made in accordance with this invention, comprises a first broaching head disposed on one side of the workpiece, a second broaching head disposed on the opposite side of the workpiece, and means for positioning the workpiece. Each broaching head has means for pulling at least one broach through the workpiece and means for supporting at least one broach at a plurality of locations at the beginning of each broaching operation and only at the trailing end of the broach as the broaching operation nears completion. The apparatus also comprises means for holding the workpiece during the broaching operation, whereby a plurality of holes are broached simultaneously.

BRIEF DESCRIPTION OF THE DRAWINGS

The objects and advantages of this invention will become more apparent from reading the following detail description in connection with the accompanying drawings, in which.

DESCRIPTION OF THE PREFERRED EMBODIMENT

Referring now to the drawings in detail there is shown a broaching machine or apparatus 1 for simultaneously broaching a plurality of holes in a workpiece which in the embodiment shown is a tubesheet 3. The apparatus 1 comprises a pair of broaching heads 5 and 7 disposed on opposite sides of the tubesheet 3. One broaching head 5 is affixed to a foundation pad 9 and the other broaching head 7 is slidably disposed on the foundation pad 9 and a hydraulic cylinder 11 moves the broaching head 7 rectilinearly toward the broaching head 5 clamping the tubesheet 3 therebetween during the broaching operation.

Figure 1:
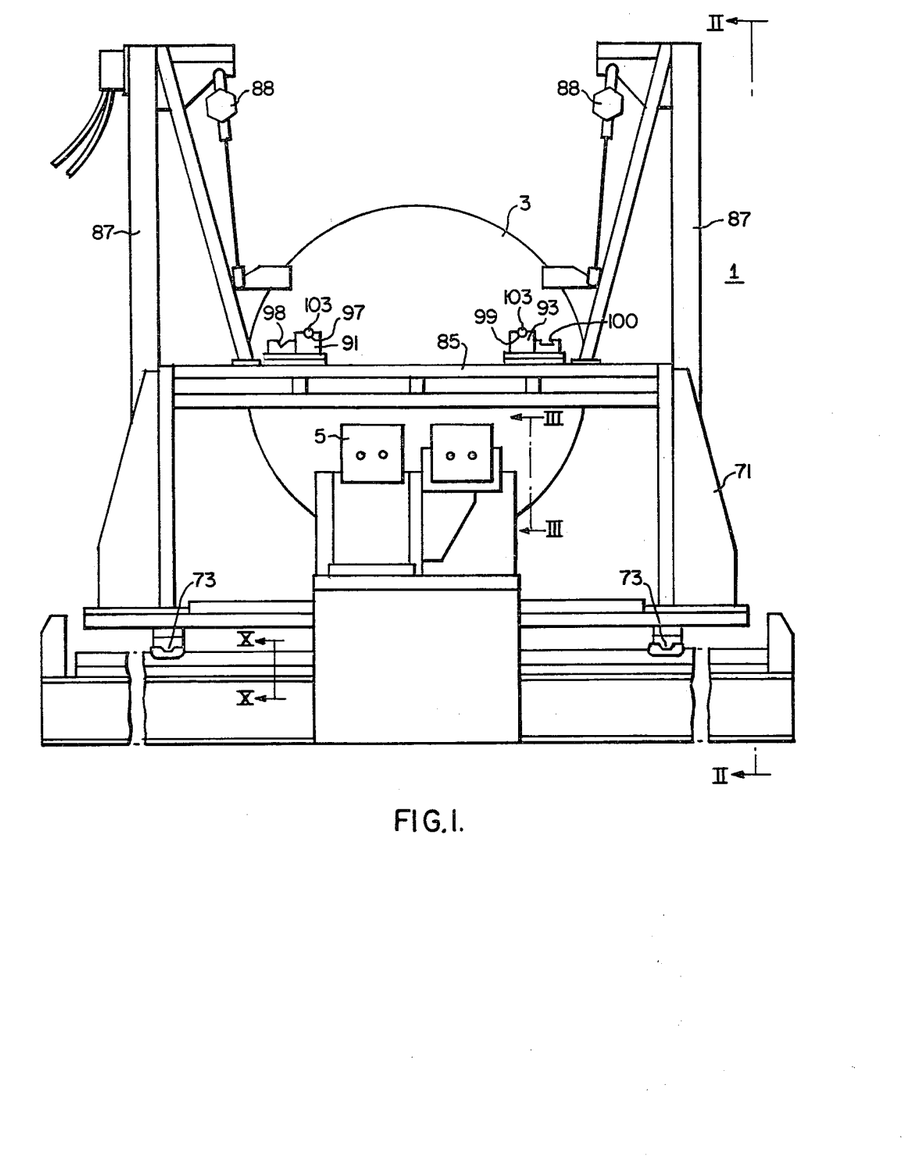
FIG. 1 is an elevational view of a broaching machine made in accordance with this invention.
Figure 2:
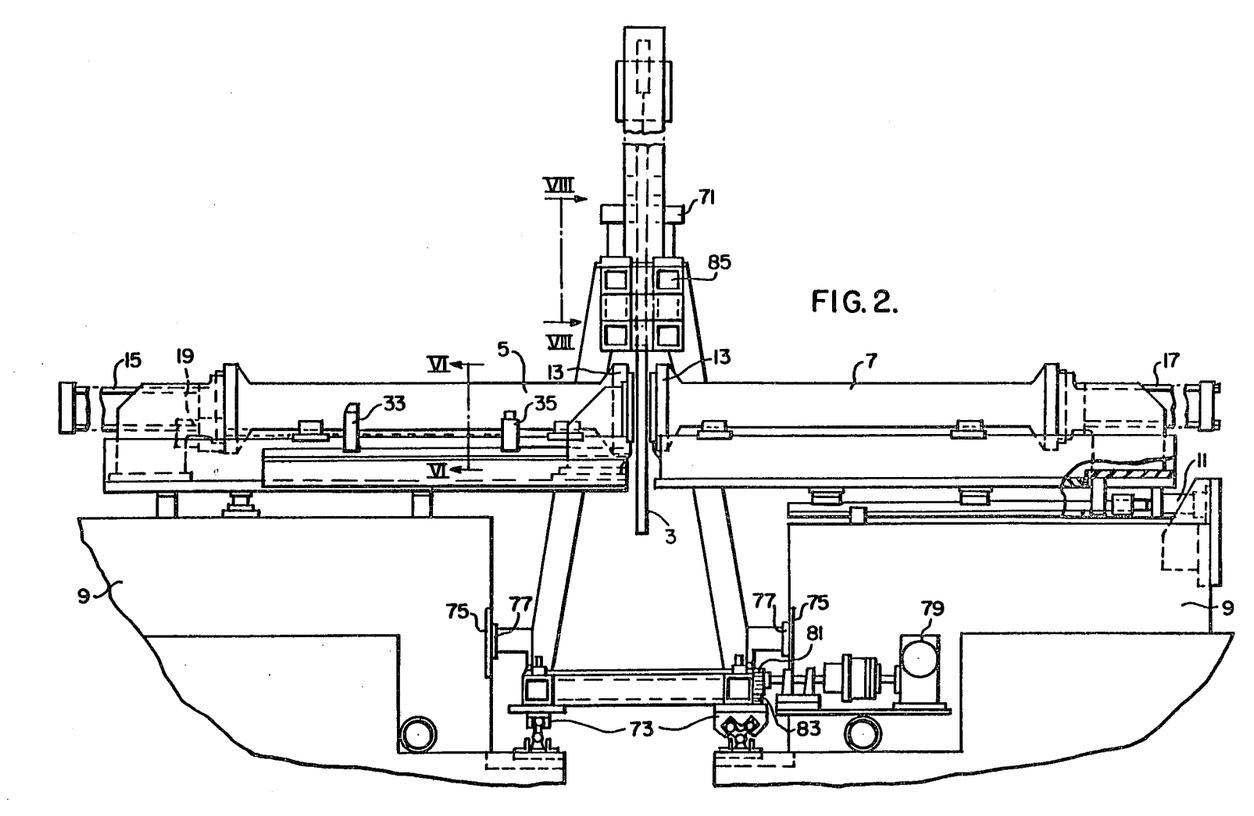
FIG. 2 is a sectional view taken on line II—II of FIG. 1.
Figure 3:
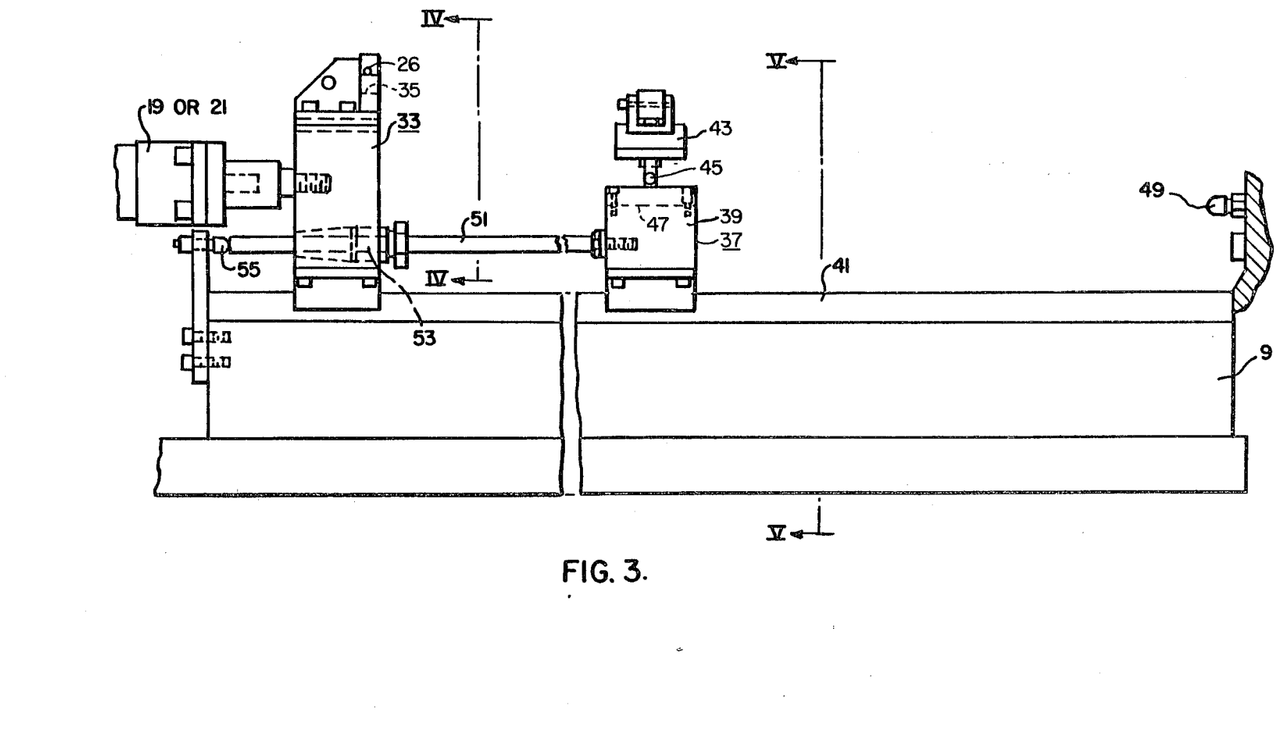
FIG. 3 is an enlarged partial sectional view taken on line III—III of FIG. 1.

As shown in FIGS. 2 and 3, each broaching head 5 and 7 comprises a faceplate 13 disposed adjacent the center of the apparatus and adjacent the tubesheet 3. Hydraulic cylinders 15 and 17 each of which supply the driving force to pull two broaches B through holes in the tubesheet are disposed on the distal ends of the broaching heads 5 and 7, respectively. Also disposed on the broaching heads 5 and 7 are two hydraulic cylinders 19 and 21, respectively, each of which feed the broaches B to the holes in the tubesheet 3 and to the opposing broaching head.

Figure 6:
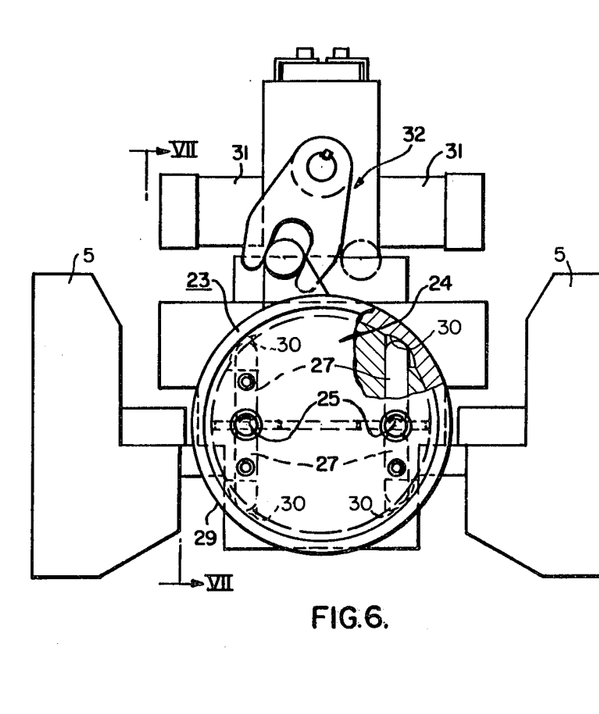
FIG. 6 is an enlarged partial sectional view taken on line VI—VI of FIG. 2.
Figure 7:
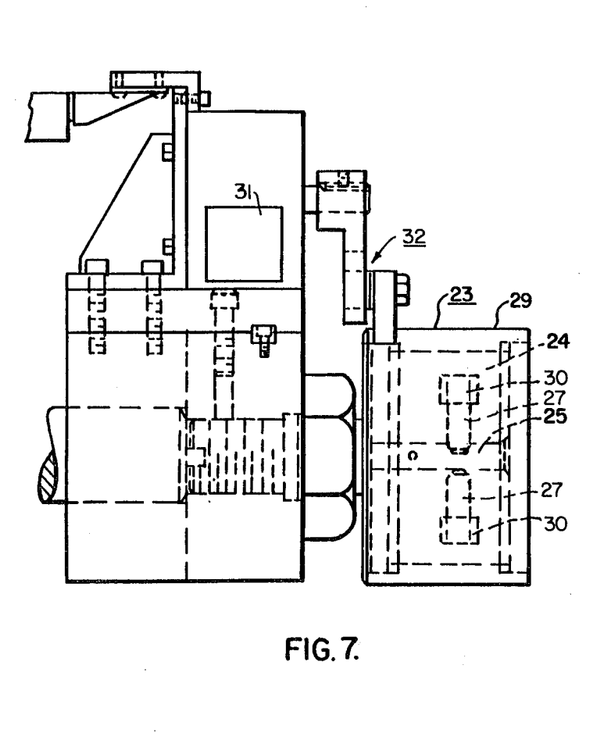
FIG. 7 is an enlarged partial sectional view taken on line VII—VII of FIG. 6.
Figure 8:
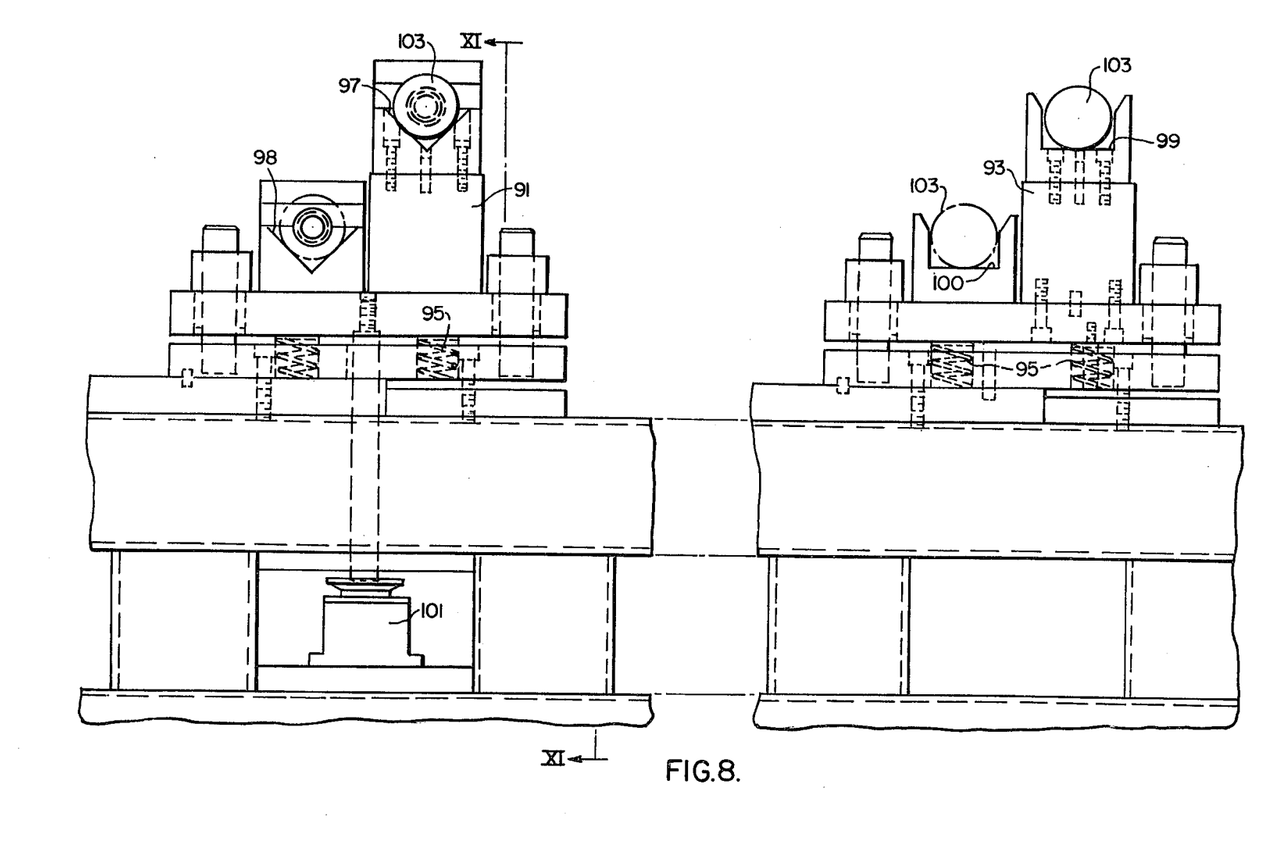
FIG. 8 is an enlarged partial sectional view taken on line VIII—VIII of FIG. 2.
Figure 9:
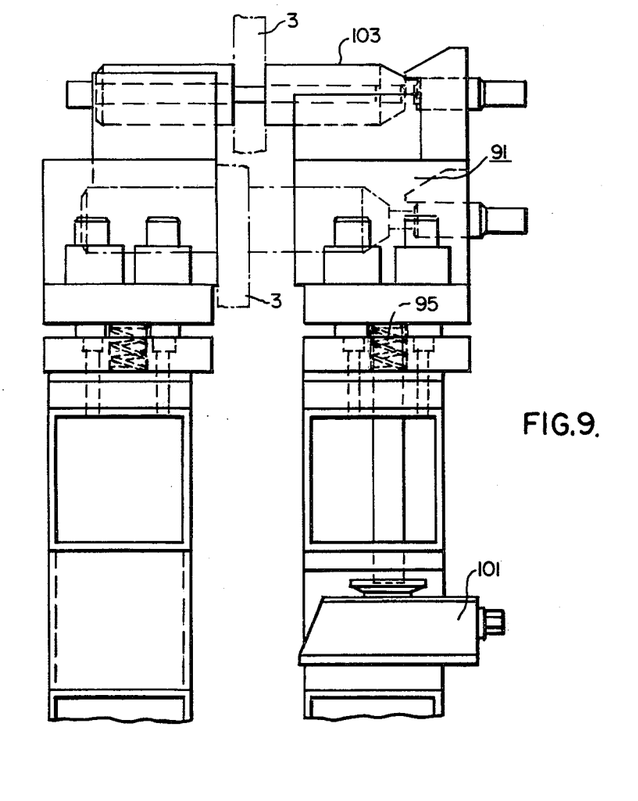
FIG. 9 is an enlarged partial sectional view taken on line IX—IX of FIG. 8.
Figure 10:
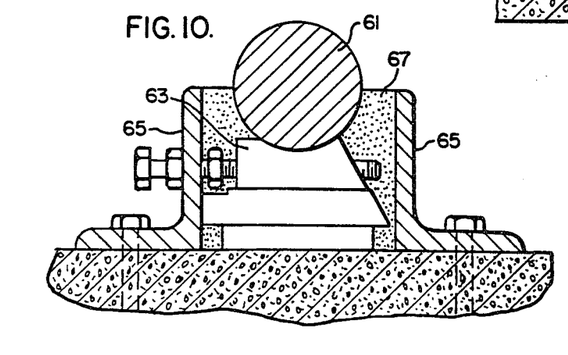
FIG. 10 is an enlarged partial sectional view taken on line X—X of FIG. 1.
Figure 11:
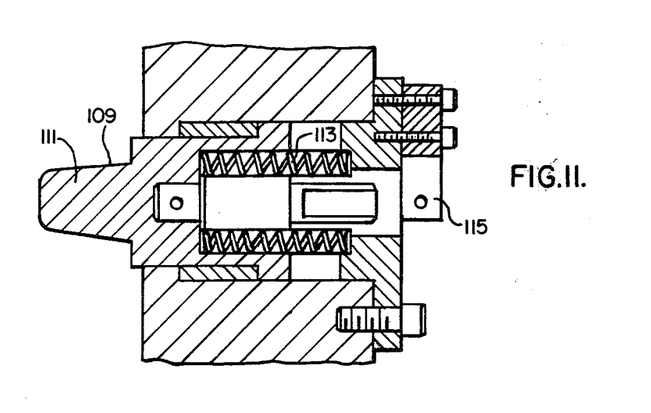
FIG. 11 is an enlarged partial sectional view of an alignment plug.

A puller head 23 as shown in FIGS. 6 and 7 is affixed to each hydraulic cylinder 15 and 17 and is pulled along the broaching heads 5 and 7 from the faceplates 13 toward the hydraulic cylinders 15 and 17. Each puller head 23 comprises a core or central portion 24 that has a circular cross section with a pair of holes 25 disposed therein to receive the leading end of two broaches B. The holes 25 have a cordal section 26 which aligns with flats B1 on the broaches B to align the broaches B with the pulling heads. Slidably disposed in each core are two pairs of clamps 27 which are disposed to intersect the holes 25 in the core and latch the leading ends of the broaches B, which have a circumferential groove adjacent their leading end, in the holes. A sleeve or ring 29 is rotatably disposed on the periphery of the core 24 and has a plurality of partial moon-shaped grooves 30, which act as cam surfaces to slide the clamps 27 into latching engagement with the grooves in the leading end of the broaches B. Hydraulic cylinders 31 rotate the sleeve 29 to latch and unlatch the broaches B in the pulling heads 23 utilizing a rotating arm and pin generally indicated at 32.

Figure 4:
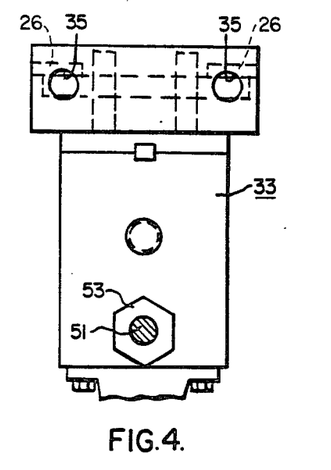
FIG. 4 is an enlarged partial sectional view taken on line IV—IV of FIG. 3.
Figure 5:
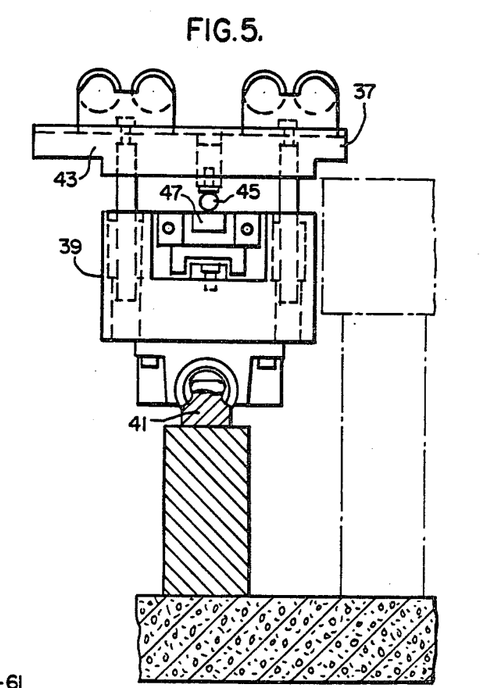
FIG. 5 is an enlarged partial sectional view taken on line V—V of FIG. 3.

As shown in FIGS. 3, 4 and 5 each broaching head has means for supporting the broaches B at two locations along their length and for feeding the broaches B to the pulling heads 23. One support 33 has holes 35 for receiving the trailing ends of the broaches B. A cordal member 26 and flat B3 on the trailing end of the broach is used to properly align the broach with the trailing end support 33. The hydraulic cylinders 19 and 21 are attached to the trailing end broach support 33 which is slidably disposed on the broaching head 23. The other broach support 37 supports the broach intermediate its ends and is slidably disposed on the broaching heads 5 and 7. The broach support 37 has a base portion 39, which is slidably disposed on a rail 41 disposed on the broaching heads 5 and 7. A bridge portion 43 is slidably connected to the base portion so that it can move up and down with respect thereto. A ball-shaped cam follower 45 is attached to the bridge portion 43 and a cam surface 47 is slidably disposed in the base portion 39 and biased to maintain the bridge portion 43 in its upper position. A bumper 49 is disposed on the broaching heads 5 and 7 adjacent the tubesheet so as to contact the sliding cam surface 47 lowering the bridge portion 43 and stopping the broach support 37 as it approaches the end of the broaching head. A rod 51 is affixed to the broach support 37 and is slidably disposed in the broach support 33. The broach support 33 has an adjustable tapered collar 53 or other means disposed to engage the rod 51 and adjust the sliding friction between the rod 51 and the broach support 37. A bumper 55 is disposed on the distal end of the broach heads 5 and 7 to contact the rod 51 as the bearing support 33 is moved away from the workpiece by the cylinders 19 and 21 respectively to position the supports 33 and 37 to receive additional broaches during the next broaching operation.

The foundation 9 has a pair of spaced apart parallel rails 61 disposed thereon. The ways are made horizontal by leveling lugs 63 and angle irons 65 are disposed on each side of each of the ways forming a trough or dam into which grout 67 is poured to provide inexpensive and yet extremely level ways upon which the machine operates.

A gantry 71 has six feet 73, four feet 73 disposed at its corners and two centrally located. The feet 73 have sliders which slide on the ways 61. A pair of thrust plates 75 are disposed in the foundation 9 on opposite sides of the gantry 71 generally parallel to the ways 61 and four thrust supports 77 extend from the gantry and slidably engage the thrust plates 75. A hydraulic ram 79 is cooperatively associated with each thrust support 77 to lock the plate 3 and in any position as it traverses the ways 61. A stepping motor 79 drives a pinion gear 81 which meshes with a rack 83 disposed on the gantry 71 to drive the gantry along the ways 61.

The gantry 71 has a pair of horizontally spaced apart beams 85 disposed about the central portion thereof. The beams 85 are spaced apart to receive the tubesheet 3 which is positioned generally vertically within the gantry. A pair of columns 87 extend upwardly on each end of the gantry and hoist 88 are suspended from the upper end thereof to raise and lower the tubesheet or workpiece 3. Tubesheet support assemblies 91, 92, 93 and 94 are disposed on each horizontal beam 85. Each support assembly 91, 92, 93 and 94 is mounted on the beams 95 so that it may be moved vertically and is maintained in its extended position by a spring 95 or other means. The supports 91 and 92 have a pair of V-shaped grooves 97 and 98 which are disposed at different elevations and the supports 93 and 94 have a pair of flat bottom grooves 99 and 100 each disposed at a different elevation. The supports 91 and 93 have a jack 101 associated therewith to lower and raise the grooves 97, 98, 99 and 100. The springs 95 in the supports 92 and 94 are sized to cause the supports 92 and 94 to follow the supports 91 and 93 when the tubesheet is supported therein. The supports 91 and 93 are axially aligned with the supports 92 and 94 respectively.

Round pins 103 having a turned down center portion 105 which fits into the holes in the tubesheet and larger end portions 107 which fit into the grooves in the supports 91, 92, 93 or 94. The pins 103 are made so that one of the enlarged end portions is removable so the turned down portion can be inserted into a hole in the tubesheet. The two levels allow fast indexing from one row to the next.

A locating pin 109 is slidably disposed in the slidable broaching head 7. The pin 109 has a tapered nose 111 to assist it in entering a hole in the tubesheet. The pin 109 is biased to its extended position by a spring 113. A microswitch or other sensor 115 is disposed adjacent the back of the pin 109 so that if the pin 109 engages the tubesheet 3 and does not enter a hole the sensor 115 sends a signal indicating that the broaching heads are not properly aligned with the holes.

Figure 12:
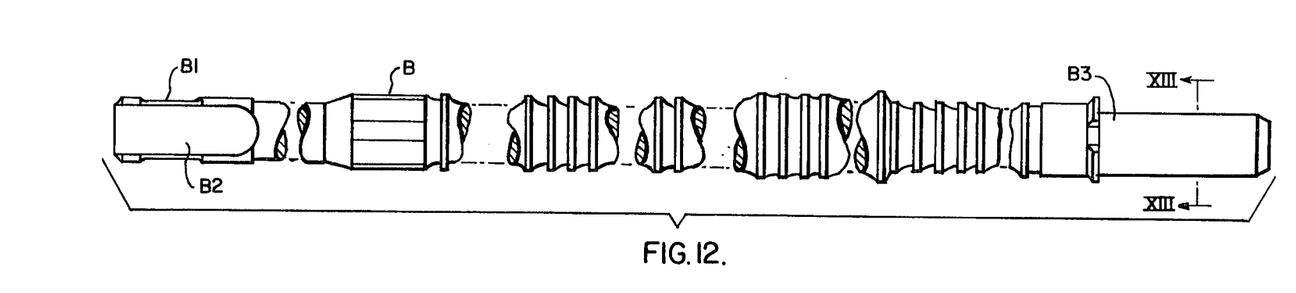
FIG. 12 is an elevational view of a broach.
Figure 13:
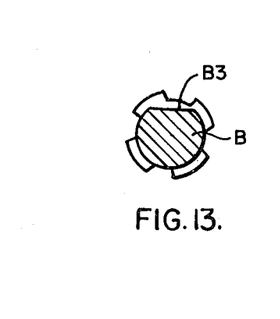
FIG. 13 is a sectional view taken on line XIII—XIII of FIG. 12.

As shown in FIGS. 12 and 13 the broach B has a leading end, the end shown on the left in the drawings, and a trailing end, the end shown on the right in the drawings. The leading end has a groove B1 in which the clamps in the pulling head 23 fits and a flat B2 which assures proper alignment of the broach in the pulling head. The trailing end also has a flat B3 to align the broach as it is being fed to the pulling head 23. The cutting teeth are graduated generally increasing in size from the leading end of the broach except that the cutting teeth adjacent the trailing end are circular and are smaller in diameter than then immediately preceding cutting teeth and serve to finish the surfaces of the original hole.

What is claimed is:

1. A support system for a broach utilized in apparatus for broaching holes in a workpiece, said support system comprising:
   a pulling head which attaches to a leading end of the broach and is utilized to pull the broach through the workpiece;
   a trailing end support which supports the trailing end of the broach and is slidably disposed in the broaching apparatus;
   an intermediate support, which supports the broach intermediate its ends and which is slidably disposed in the broaching apparatus;
   said intermediate support having a bridge portion slidably disposed thereon and means for moving said bridge portion downwardly as the intermediate support approaches the workpiece to allow the broach to slide thereover without contacting the intermediate support.

2. A support system as set forth in claim 1, wherein the means for moving the bridge portion downwardly comprises a cam surface slidably disposed in the intermediate support and a bumper disposed adjacent the workpiece, the bumper contacting the cam surface to cause the bridge portion to move downwardly.

3. A support system as set forth in claim 1, wherein the intermediate support is slidably connected to the trailing support.

4. A support system as set forth in claim 3, wherein the slidable connection between the intermediate and trailing support has sufficient frictional contact that these supports move together until the intermediate support contacts a bumper and a bumper is disposed to contact the intermediate support at each end of its travel.

* * * * *